GAS DISPERSOID SEPARATOR

Filed Feb. 12, 1962

INVENTOR.
Leonard Boddy
BY
Harness, Dickey + Pierce
ATTORNEYS.

INVENTOR.
Leonard Boddy
BY
Harness, Dickey & Pierce
ATTORNEYS.

April 19, 1966 L. BODDY 3,246,455

GAS DISPERSOID SEPARATOR

Filed Feb. 12, 1962 3 Sheets-Sheet 3

INVENTOR.
Leonard Boddy
BY
Harness, Dickey & Pierce.
ATTORNEYS.

United States Patent Office 3,246,455
Patented Apr. 19, 1966

3,246,455
GAS DISPERSOID SEPARATOR
Leonard Boddy, Ann Arbor, Mich., assignor to King Engineering Corporation, Ann Arbor, Mich., a corporation of Michigan
Filed Feb. 12, 1962, Ser. No. 172,740
10 Claims. (Cl. 55—319)

This invention relates generally to separation and purification systems, and more particularly to a novel apparatus for effecting the separation of a gas dispersoid from its gaseous suspension medium. This application is a continuation-in-part of my copending application Serial No. 63,428, now abandoned.

A gas dispersoid is solid or liquid matter existing in suspension in gases, and within its definition would include such items as dusts, fumes, sprays or mists, the latter two referring to liquid suspended matter. It is the separation and purification of a gas having liquid matter suspended therein to which the present invention is primarily directed. As will be appreciated, there is often a great need to remove suspended matter from its gaseous suspension medium, such as where either the suspended material or the gaseous medium or both are valuable and are desired to be collected or where the suspended material is simply an impurity or contaminant in the gaseous medium, in which case purification of the latter is desired. One very common instance exists with respect to the air discharged from vacuum pumps, compressors, turbines and like equipment, wherein the discharge air is laden with an oil or water mist and the removal thereof is desired, such as when the air is to be subsequently used for breathing or in delicate instruments or the like.

Large droplets or particles of a suspended liquid are, of course, relatively easy to remove, such as by means of ordinary baffle plates or the like, or by the use of conventional filters. However, such is not true of dispersoids or mists because the droplets or particles of which they are composed are extremely small in size and weight. Thus, baffles and the like are not satisfactory because the small particles will simply follow the flow of air around the baffles, the inertia of the particles themselves being practically infinitesimal. Similarly, conventional filters are inadequate. In some cases in the past, relatively expensive special type filters have been used, but usually these special filters must necessarily be so dense, to block the flow of the extremely small particles, that they create an often intolerable pressure drop in the flow through them. Also they suffer the disadvantage which all filters suffer, namely, that they eventually become clogged and must be cleaned or replaced. One relatively efficient manner in which mists have been removed from the air has been by use of an electrical precipitator, wherein the mist particles are electrostatically charged and then attracted to poles of dissimilar charge. Such equipment, however, is both complicated and expensive, and presents difficult insulating problems when the mist particles to be removed are themselves electrically conductive.

The present invention, on the other hand, is concerned with the provision of a novel separation and purification system, embodied in apparatus form, in which the aforementioned disadvantages and problems are effectively eliminated. In its broader aspects, one feature of this invention resides in the provision of a unique apparatus for effectively mechanically separating a gas dispersoid or mist from its gaseous medium. This separation is effected by a gravity assisted mechanical separator or separation step in which a substantially complete reversal of the flow of the medium is utilized. To make possible the mechanical separation of suspended particles as fine as those found in dispersoids or mists, there is provided a condenser element or condensing step in which these extremely small particles are coalesced and agglomerated prior to separation to form them into larger conglomerate particles which are of sufficient size to be separable.

Another feature of this invention resides in the provision of a nozzle or acceleration step in which the condensed or conglomerate particle flow is accelerated prior to separation, thus further increasing the efficiency of the actual mechanical separation. This arrangement has been found to be capable of effectively removing 96 to 97% of the dispersoid or mist particles in a gaseous medium. A further feature of the invention, however, resides in the provision of a filter element or filtering step, in combination with the aforementioned arrangement, in which removal of the remaining few dispersoid or mist particles which were not sufficiently condensed to be mechanically separated may be achieved.

It is therefore a primary object of the present invention to provide a novel apparatus comprising combined condensing and separating means so arranged that even the minutest particles in a gas dispersoid may be effectively mechanically separated from the suspension medium, which apparatus is further adapted to be provided with combined filter means for removing any dispersoid particles still too finely atomized to have been mechanically separated. A related object is the provision of a novel method for effectively separating a gas dispersoid or mist from its suspension medium, and a specially constructed condenser element particularly suited for the removal of oil and water mists, solids, and anything else normally found in ordinary compressed air systems.

Another object of the present invention is the provision of a novel apparatus of extremely simple and inexpensive design for effecting the separation of gas dispersoids or mists as well as entrained droplets, from a gaseous suspension medium, wherein there are utilized replaceable and disposable condenser and filter elements of unique construction, the condenser element being so constructed that its effectiveness actually increases through continued use.

Yet another object of the present invention is the provision of a novel apparatus of the type described having a very flexible arrangement of parts wherein there may be utilized interchangable condenser elements and interchangeable filter elements, whereby condenser and filter elements having different particle-condensing and particle-removal characteristics, respectively, may be interchanged conveniently, cleanly and quickly in the apparatus to provide for the separation of a variety of dispersoid materials from a variety of gaseous suspension mediums.

A further object concerns the provision of an apparatus of the type described comprising condensing means in combination with mechanical separating means, wherein there is also provided means for accelerating the condensed particle flow from the condensing means to the separting means, whereby the operation of the latter is rendered more efficient. A related object is the provision of a unique arrangement of parts whereby the mechanical separation process is gravity assisted.

Yet another object thereof is the provision of a unique apparatus for separating mist or dispersoid particles from a gaseous suspension medium which is so designed that it cannot become clogged, wear out, or otherwise deteriorate, and in which the efficiency of operation actually increases through continued use.

Another object of the present invention involves the provision of a novel combined separating and filtering apparatus wherein separation is achieved by a combined condenser and separator having an unlimited life, and wherein filtration is achieved by a filter which, because of the efficiency of the separation process, has a much longer life and is much simpler and less expensive in construction than previously known special filters for per-forming the function of this apparatus. A related object concerns the provision of such an apparatus, wherein a wide range of flow rates are obtainable at a minimum pressure loss, and wherein the pressure drop across the condenser and separator will remain substantially constant for constant upstream pressures for the life of the apparatus.

Yet another object of this invention is the provision of a novel removable filter element of simple, effective, and inexpensive design, which filter element is of sturdy construction and yet inexpensive enough to be disposable, and which comprises means whereby it may be conveniently and easily mounted within an apparatus of the aforementioned type in a detachable interchangeable manner.

A further object thereof resides in the provision of a novel removable and interchangeable condenser element for use in an apparatus of the aforementioned type, which element is of simple, sturdy, efficient and economical design, and one which is particularly suited for the removal of oil and water mists from ordinary compressed air systems. A related object is the provision of such a filter element which also comprises unique nozzle means of special design for accelerating the discharge flow therefrom.

A still further object of the present invention concerns the provision of a novel apparatus having no moving parts for the separation of gas dispersoids from their suspension mediums, which apparatus is more flexible in application and has a substantially longer operating life than any equivalent filter system for the same application.

These and other objects of the present invention will become apparent upon consideration of the present specification taken in conjunction with the accompanying drawings in which there are shown several embodiments of the invention by way of example, and wherein.

Figures 1, 2, 3, 4:
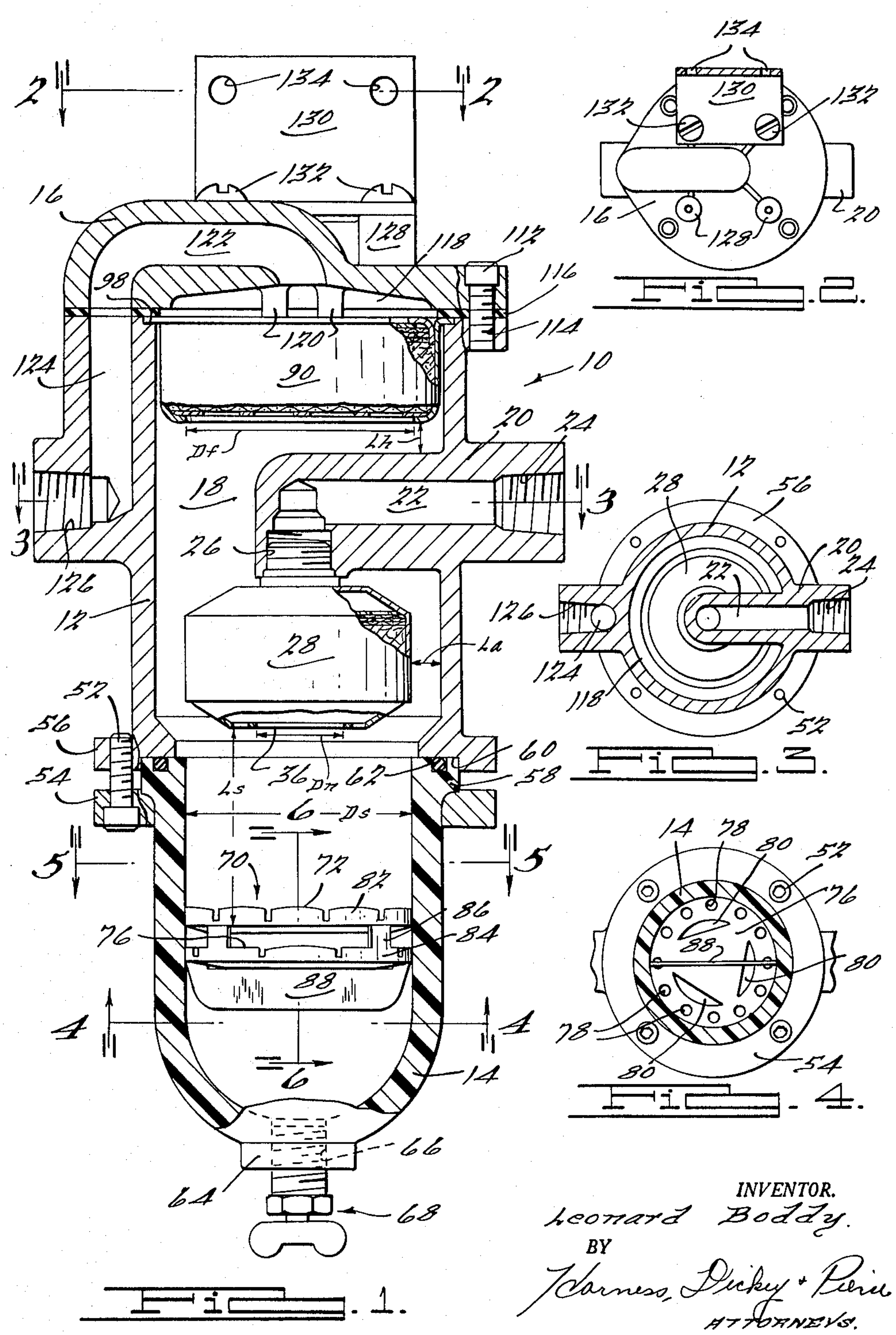
FIGURE 1 is an axial sectional view of a first embodiment incorporating the principles of the present invention.
FIGURE 2 is a top plan view of the embodiment shown in FIGURE 1.
FIGURE 3 is a sectional view taken along line 3—3 in FIGURE 1.
FIGURE 4 is a sectional view taken along line 4—4 in FIGURE 1.

As has been pointed out, the present invention is directed to a novel separating and filtering system and is embodied in apparatus form, including several exemplary embodiments.

One important feature of the present invention resides in the provision of several novel embodiments of an apparatus for separating gas dispersoids. Thus, referring to the drawings, there is illustrated in FIGURES 1 through 6 a first embodiment of the present invention. The first embodiment, generally indicated at 10, comprises a generally cylindrical body housing 12 having detachably secured at the lower end thereof a sump bowl 14 and at the upper end thereof a cover member 16. Body housing 12 defines a central chamber 18 and is provided roughly intermediate its ends with an integrally formed boss 20, extending radially inwardly and outwardly from the side wall of the body housing. Boss 20 defines a longitudinally extending inlet passageway 22, threaded at the outer end thereof, as at 24, for receiving in the conventional manner an inlet line (not shown), and is provided at its inner end with a downwardly directed axially disposed threaded opening 26 for threadably receiving a condenser element 28.

Figures 5, 6, 7, 8, 9:
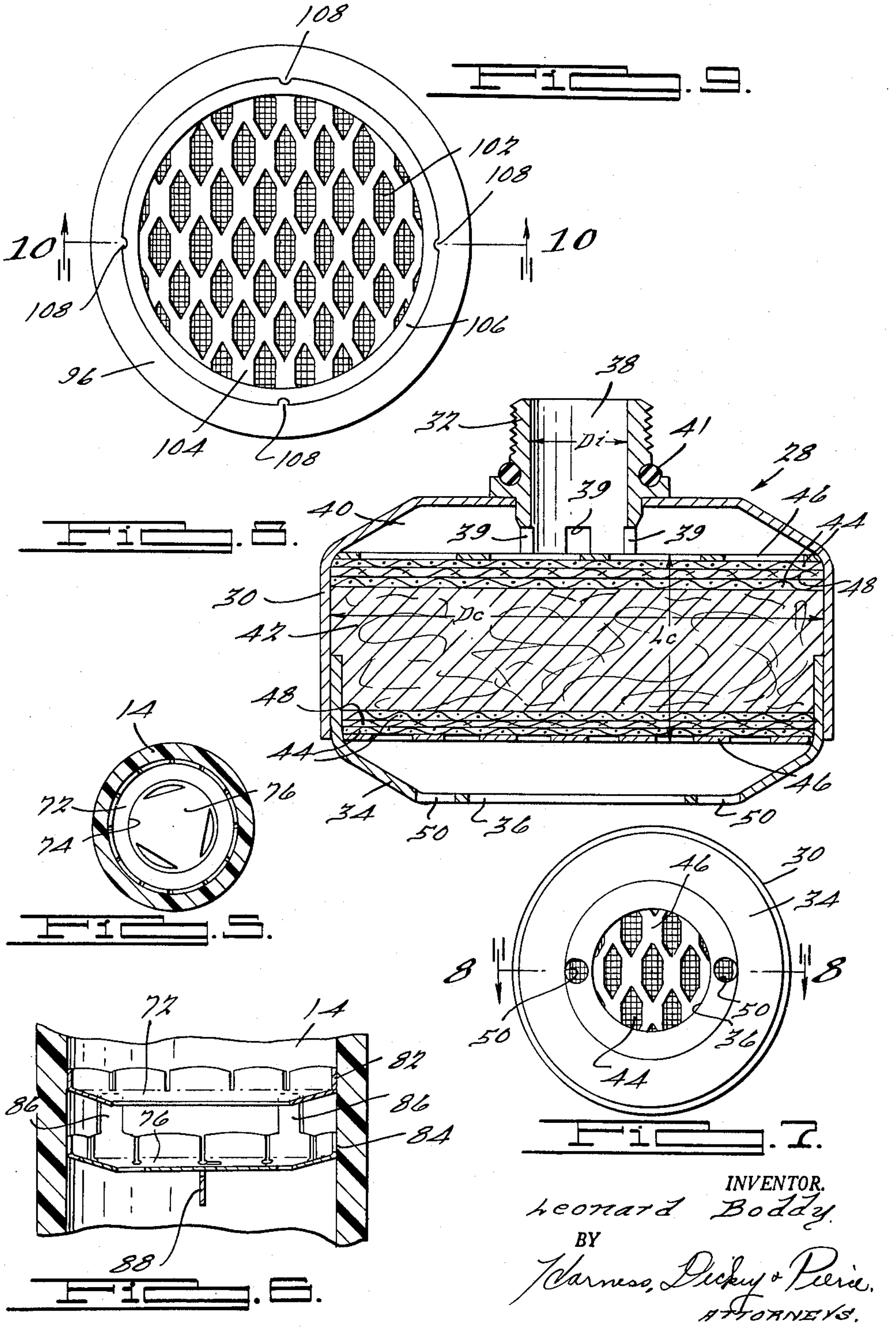
FIGURE 5 is a sectional view taken along line 5—5 in FIGURE 1.
FIGURE 6 is an enlarged sectional view taken along line 6—6 in FIGURE 1.
FIGURE 7 is a bottom plan view of a condenser element forming part of the present invention.
FIGURE 8 is a sectional view taken along line 8—8 in FIGURE 7.
FIGURE 9 is a bottom plan view of a filter element forming part of the present invention.

Condenser element 28, best illustrated in FIGURES 7 and 8, comprises a generally bell-shaped upper casing portion 30 provided at the upper end thereof with a threaded fitting 32 adapted to be threadably received within threaded opening 26 in a detachable connection, and provided at its lower end with a generally frusto-conical bottom portion 34 having an axially disposed restricting orifice or nozzle 36 therethrough. Fitting 32 is provided with an axially extending inlet passageway 38 communicating at its open lower end with the interior of the condenser element casing, indicated at 40. To provide a fluid-tight seal between the condenser element 28 and the boss 20, there may be provided a suitable O-ring as at 41. At the lower open end of passageway 38, there are provided a plurality of radially extending passageways 39 for introducing inlet flow across the entire upper surface of a suitable condensing medium 42 disposed within the interior 40 of casing 30 for coalescing and agglomerating mist or dispersoid particles passing therethrough. The condensing medium, the details of which will be discussed hereinbelow, is supported in place by means of two pairs of relatively fine mesh screens 44, in turn supported by a pair of reinforcing grids 46 engaging the inwardly sloping top and bottom walls of interior chamber 40, respectively, to be held in place thereby. While two pairs of screens are desired for intermittent flow applications, one pair will suffice if the flow is relatively constant. To prevent the condensing medium 42 from escaping through screens 44 and to assist in the condensing action, there are provided a pair of liners 48 of finely woven material, such as nylon or Dacron fabric or the like, disposed between each pair of screens 44.

The casing portions 30 and 34 may be of sheet metal construction, joined together in any suitable manner, such as by means of soldering or brazing, swedging, or by a press fit. Fitting 32 may be secured to casing portion 30 by soldering, or the like. To facilitate easy assembly and removal of the condensing element, casing portion 34 is provided with a pair of opposed apertures 50 adapted to receive a spanner wrench, or the like.

Sump bowl 14 is detachably secured to body housing 12 by means of a plurality of circumferentially spaced bolts 52 passing through a suitably apertured retaining ring 54 into a plurality of appropriately spaced threaded apertures in a radially extending flange 56 at the lower end of body housing 12. The retaining ring 54 engages a radially extending flange portion 58 at the upper end of sump bowl 14 to hold it against the body housing. A fluid-tight seal is achieved between the sump bowl and body housing by the provision of a recessed portion 60 in flange 56 adapted to receive flange 58, and the provision of an O-ring 62 on the upper surface of flange 58. Of course, a threaded connection may be provided between the sump bowl body housing in lieu of bolted flanges, if desired. As can be seen, the opening in the lower portion of body housing 12 is large enough that it in no way obstructs the flow of material from the condenser element 28 into sump bowl 14.

At the lower end of sump bowl 14 there is provided an axially extending boss 64 having a threaded aperture 66 therethrough, in which is threadably secured a manually operative petcock 68. Rigidly secured within the reservoir defined by sump bowl 14 are baffle means 70 for reversing the direction of flow from the condenser element. Baffle means 70 may be of any suitable construction, but the specific construction illustrated has been found to give excellent results. Thus, baffle means 70 comprises an upper baffle plate 72 having an axially disposed central opening 74 therethrough, and a lower baffle plate 76 having a plurality of circumferentially spaced openings 78 adjacent the periphery thereof and a plurality of segmental-shaped, symmetrically arranged apertures 80. Baffle plates 72 and 76 are provided with upwardly extending slotted flanges 82 and 84 respectively, which serve to rigidly secure the baffle plates to the side walls of sump bowl 14, as by means of a press fit with the latter. The two baffle plates are suitably spaced by means of a plurality of upstanding tabs 86 on the lower baffle plate 76. The lower baffle plate 76 is also provided with a transversely extending baffle member 88 on the lower side thereof. Sump bowl 14 may be formed of any transparent plastic material, such as Lucite, for reasons which will be more clear hereinafter.

Figure 10:
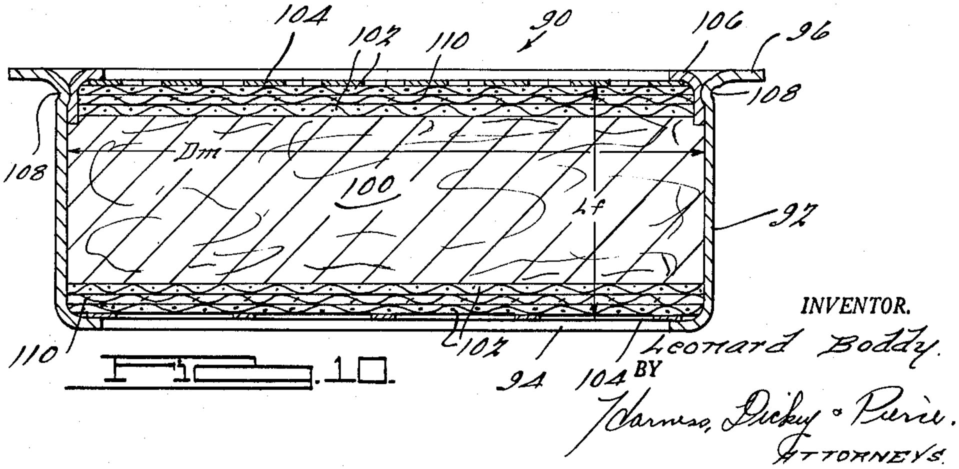
FIGURE 10 is a sectional view taken along line 10—10 in FIGURE 9.

At the upper end of chamber 18 there is provided a filter element 90, best illustrated in FIGURES 9 and 10, comprising a generally cylindrical casing 92 of sheet metal or the like having an axially disposed opening 94 therethrough at the lower end thereof, and at the upper end thereof an outwardly extending flange 96 adapted to be received within a recess 98 formed in the upper edge of body housing 12. Disposed within filter element 90 is suitable filter medium 100, to be described in greater detail hereinafter. The filtering medium 100 is supported in place by means of two pairs of relatively fine mesh screens 102, in turn supported by a pair of reinforcing grids 104. The lower grid 104 is supported by means of its engagement with the peripheral edge of the bottom wall of cylindrical casing 92, and the upper grid 104 is held in place by means of an inwardly extending flange member 106 rigidly secured within casing 92, such as by swedging the casing, as at points 108, to interlock the two members in the manner illustrated. Flange member 106 defines an opening of substantially the same size as opening 94. To prevent the filtering medium 100 from escaping through screens 102 and to assist in the filtering action, there are provided a pair of liners 110 of finely woven material, such as nylon fabric or the like.

Filter element 90 is rigidly but detachably maintained in position by the downward clamping action of cover member 16, effected by means of a plurality of circumferentially spaced bolts 112 extending through cover member 16 into suitably spaced apertures 114 in the upper end of body housing 12. To prevent the leakage of fluid between body housing 12 and cover member 16 there is provided therebetween a sealing gasket 116 of suitable flexible material. Cover member 16 is provided on the lower surface thereof with a downwardly open cavity 118 communicating with the upper surface of element 90, and having a plurality of integrally formed downwardly extending lugs 120 adapted to abut the central upper surface of upper grid 104 to further maintain it in position. Cover member 16 also defines an outlet passageway 122 communicating at one end thereof with cavity 118 and at the other end thereof with an outlet passageway 124 in body housing 12. At the lower end of outlet passageway 124 in transverse alignment with inlet passageway 22, there is provided a suitably threaded opening 126 adapted to receive an ordinary discharge line (not shown).

On the upper surface of cover member 16 there are provided a plurality of symmetrically arranged upwardly extending bosses 128 having threaded apertures therein for supporting an angle bracket 130 for mounting the entire apparatus. Angle bracket 130 is provided with a pair of appropriately spaced apertures for receiving mounting screws 132, whereby the bracket may be secured to the cover member in a plurality of positions by means of the threaded engagement of screws 132 with the threaded apertures in any appropriate pair of bosses 128. Angle bracket 130 is also provided with apertures 134 by means of which the entire apparatus may be secured to any suitable supporting structure.

Considering in greater detail the construction of the condenser and filter elements, it has been found that there are a number of suitable compositions or substances which may be used as the condensing and filtering mediums. In fact, it has been discovered that not only may inexpensive and readily available materials be used to obtain satisfactory results, but also that the same materials may be used in both of the elements. For example, very satisfactory results have been obtained using many of the various earths, such as Floridin Earth, Attapulgus, or the one found in Miami, Oklahoma, and commercially available under the trademark Flor-Dry, No. 85, which has a great affinity for oil and is thus excellent for the separation and filtering of oil particles. Actually, some of the readily available earths have an affinity to both oil and water, and thus may be used interchangeably in applications directed to the removal of either or both of these liquids. Other well-known fibrous or granular materials may also be used, depending on the particular application. In choosing a suitable material, as well as the proper grain or fiber size and the density to which the material should be packed, consideration should be given to the type of liquid matter which is to be separated and filtered, the efficiency of separation and filtering desired, and the maximum pressure drop which may be tolerated across the entire apparatus. Thus, high density material of very small grain size may be used in high pressure drop, low flow rate applications for the most complete separation, while coarser, lower density material may be used in low pressure drop, high flow rate applications where more moderate separation is satisfactory. Because of the fact that inexpensive materials may be used, it is contemplated that the elements may be disposable, although as a practical matter the condensers are of unlimited life.

As has been emphasized previously, the condenser and filter elements do not function in the same manner, even though they may contain the same filter medium. The condenser element functions in a thoroughly wetted or saturated state and serves to coalesce and agglomerate the dispersoid particles passing therethrough, while on the other hand, the filter element operates in a relatively dry state and removes the few remaining liquid particles in the gaseous medium exclusively by means of a filtering process, wherein the particles to be removed are mechanically blocked by the filtering medium and/or absorbed thereby. Very economical fabrication of the present invention is thereby made possible, both through the use of relatively inexpensive filtering and condensing materials, and due to the fact that the same material may be used in both elements.

It is to be understood that the present invention is readily capable of effecting the separation of practically any gas dispersoid from its gaseous suspension medium, however, for purposes of description the operation of the present invention will be discussed, by way of example, in terms of removing oil which is normally present in the air discharged from a conventional compressor or the like, this being exemplary of one of the more common practical applications of the invention. Thus, in such an application, the discharge line from the compressor would be threadably secured within threaded aperture 24 in communication with inlet passageway 22. Since the first embodiment is adapted for inline mounting, a suitable discharge line would be threadably connected within threaded aperture 126 to carry purified air to wherever it is required. As will be appreciated, the inlet flow of air will be under relatively high pressure, and will contain dispersoid or mist particles of finely atomized oil, as well as much larger entrained droplets or slugs of oil in most cases. This inlet flow, due to its pressure, will pass through inlet pasageway 22 and then down through passageway 38 into the condenser element 28, and thence through the condensing medium 42. The entire upper surface of the condensing medium will receive this inlet flow due to the provision of radially extending openings 39. In fact, the space within casing 30 above the bed of condensing medium acts as an expansion chamber, so that some of the entrained liquid may be condensed out at this point due to the temperature drop. In this exemplary application both the condensing medium and the filtering medium might preferably consist of a compacted mass of any suitable material having a natural affinity for oil.

Initially, the condenser medium is dry, but as the oil ladened air flows therethrough it gradually becomes wetted with oil. Until the material is thoroughly wetted and saturated the condensing process does not operate at maximum efficiency, which alone distinguishes this condensing process from the normal filtering process, wherein once the filter is wetted it is no longer effective as a filter and hence must be replaced. The condensing medium is wetted by the impingement of both the minute and large oil particles against the grains thereof as the inlet flow passes through the condenser element. This impingement or impact causes the individual particles to deform and coat the individual grains in the condensing medium, the inherent cohesiveness of the separate particles causing them to coalesce and agglomerate. The coating which is thus formed upon and in the interstices between the grains of condensing medium is continually carried out of the condenser element in much larger conglomerate drops by the flow of air therethrough.

As is apparent, the presence of entrained droplets or slugs of oil in the inlet flow will in no way affect the operation of the condensing process, and the discharge therefrom will comprise droplets of oil which individually are of a sufficient size to be mechanically separated. Since the condensing medium is most efficient when it is thoroughly saturated with oil it has an almost unlimited life. It need be replaced only when a condenser element having different condensing characteristics is desired, or when, for some reason, it becomes clogged with solid matter carried by the inlet flow. In any case, however, removal and replacement of the condenser element is very easily, cleanly and inexpensively effected by simply unscrewing it from threaded opening 26. In fact, it is not even necessary to remove the entire apparatus from the air line, as it is only necessary to remove sump bowl 14 in order to gain access to the condenser element.

The condensed or conglomerate flow from the condenser medium is accelerated downwardly by means of the nozzle or restricting orifice 36. This accelerated flow then strikes baffle means 70 which serves to reverse the direction of the downwardly flowing air, whereupon it passes upwardly along the side walls of the sump bowl and body housing around the outside of the condenser element. The accelerated condensed or conglomerate particles of oil, however, have been imparted with too much kinetic energy in the downward direction to be capable of being reversed in direction of flow along with the flow of air. Thus, the oil particles strike the baffle and drain therefrom into the lower or sump portion of the sump bowl. The baffle prevents the air jet issuing from the condenser element from directly striking the surface of oil collected in the sump bowl so that it is prevented from picking up some of the oil in the sump and carrying it upwardly in the air stream or up along the side walls of the sump bowl and body housing. In actual operation, when the level of oil in the sump bowl reaches the level of the baffle plates, as will be visible if the bowl is formed of a transparent material, the petcock 68 should be opened to drain away the oil in the sump. It should be noted that because of the direction of flow the conglomerate particles of oil issuing from the condenser element are accelerated both by the restricting orifice and the force of gravity, whereby maximum separation efficiency can be obtained. To further increase the separation efficiency, the apparatus is constructed so that the downward velocity of the air will be greater than the upward velocity, and this may be achieved by making the cross-sectional area of the annular passageway around the outside of the condenser element, through which the air flows upwardly, greater than the cross-sectional area of the restricting orifice 36, through which the mixture flows downwardly.

As has been pointed out, the separation process of the present invention is capable of removing from 96 to 97% of the oil carried in the inlet air. However, there are bound to be a few finely atomized oil particles which are not condensed, and these particles, because of their almost infinitesimal weight, will be carried upwardly with the separated air flow. In critical applications wherein it is desired that these few particles also be removed from the air, there may be provided a filter element 90 for filtering from the upward flow of air those few remaining particles. Since the filter element must filter only a very small amount of oil, its useful life is very much greater than the life of a conventional filtering system for the same purposes as the present apparatus. In addition, it may be so constructed that it presents a filtering surface having a cross sectional area almost as great as the cross-sectional area of the entire body housing. This reduces the pressure drop which would otherwise occur thereacross. When it is desired to replace the filter element, such as when it eventually becomes clogged or when it is to be replaced by an element having different filtering characteristics, its removal and replacement may be cleanly, economically and simply effected by removing cover member 16, there being no need to remove the entire apparatus from the air lines to which it is connected. It has been found that the present combined condensing, separating and filtering apparatus is capable of removing around 98% of the liquid oil particles greater than one or two microns in size from an air stream.

Figures 11, 14:
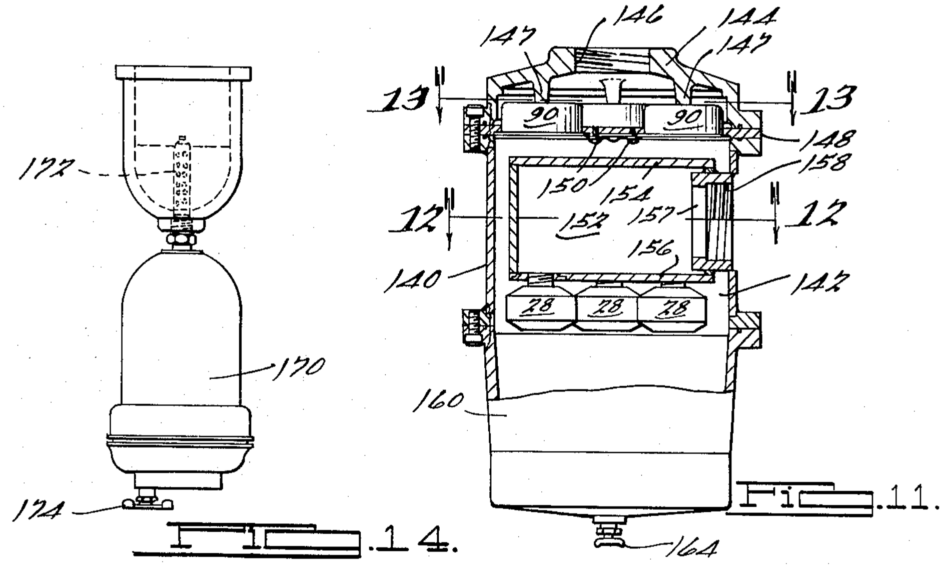
FIGURE 11 is an axial sectional view of a second embodiment of the present invention.
FIGURE 14 is a view illustrating a float operated trap which may be utilized in the first or second embodiment of the invention.
Figures 12, 13:
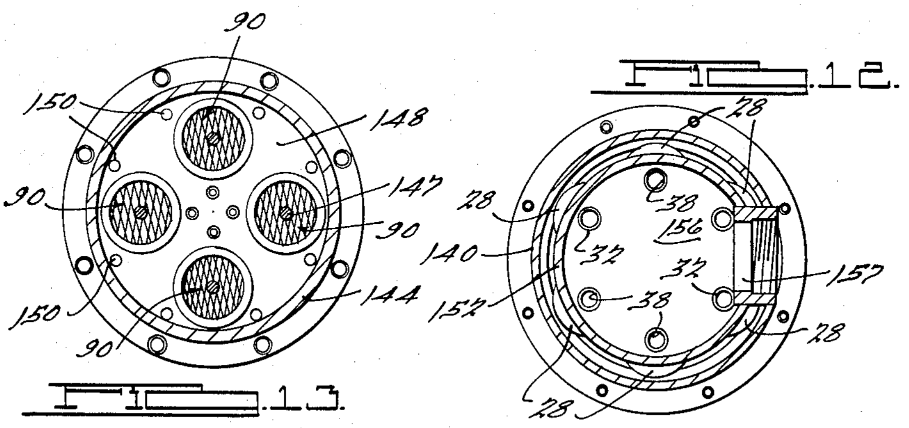
FIGURE 12 is a sectional view taken along line 12—12 in FIGURE 11.
FIGURE 13 is a sectional view taken along line 13—13 in FIGURE 11.

The second embodiment of the present invention is illustrated in FIGURES 11 through 13. This embodiment is identical in principle to the first embodiment and operates in exactly the same manner, differing therefrom only in that it is adapted to handle much larger capacities. In addition, it utilizes the same condenser and filter elements as the first embodiment.

Referring to the drawings, there is provided a generally cylindrical body housing 140 defining a chamber 142. Detachably secured to the upper open end of body housing 140, as by means of a conventional bolted flange arrangement, is a cover member 144 having a threaded opening 146 therein adapted to receive a discharge line (not shown). Clamped between cover member 144 and body housing 140 is a supporting plate 148 having a plurality of apertures therethrough for receiving a plurality of filter elements 90. In this embodiment the filter elements 90 are inverted, and are detachably maintained in position on supporting plate 148 by means of a plurality of screws 150 which hold the flanges 96 of the filter elements against the lower surface of the supporting plate in the manner illustrated. Suitable O-rings may be provided between the cover member, body housing and supporting plate to provide a leak-proof connection therebetween. As can be seen, cover member 144 is so designed that the upper surfaces of filter elements 90 are in communication with opening 146. In addition, cover member 144 is provided with a plurality of downwardly extending lugs 147, each of which is adapted to abut and reinforce the upper surface of the corresponding filter element 90. If desired, a single, larger filter element similar in construction to the smaller elements may be provided in lieu of the plurality of smaller elements shown, the construction of the filter not being as critical as the construction of the condenser.

Coaxially disposed within chamber 142 is a drum member 152 comprising cylindrical side walls and upper and lower wall portions 154 and 156 respectively. Drum member 152 is supported by means of a tubular fitting 157 secured to both it and the body housing 140 and defining an inlet passageway having a threaded opening 158 adapted to receive an inlet line (not shown). Bottom wall portion 156 is provided with a plurality of threaded apertures into which are threadably secured a plurality of condenser elements 28 in the manner illustrated. As will be appreciated, passageway 38 in each of the condenser elements is in communication with the interior of drum member 152.

Detachably secured by means of a bolted flange to the lower open end of body housing 140 is a lower member 160 which forms a sump bowl similar to sump bowl 14 in the first embodiment. The sump bowl 160 is provided with a manually operable petcock 164 at the lower end thereof, and disposed within its interior are baffle means identical in construction to the baffle means 70 in the first embodiment. The detachable connection between body housing 140 and lower member or sump bowl 160 may be in the form of a conventional bolted flange arrangement wherein there are provided suitably located O-rings to establish an effective seal.

As it is clearly apparent, the operation of this embodiment is identical to that of the first embodiment. Thus, assuming the same exemplary application, the inlet mixture flows into the apparatus through fitting 157 into drum member 152, whereupon, due to its pressure, it is forced downwardly through condenser elements 28. As before, the condenser elements serve to coalesce and agglomerate the minute oil particles to form them into substantially larger conglomerate particles. The air and conglamerate particle mixture is then accelerated through the respective restricting orifices 36 downwardly toward the sump bowl 160. This mixture then strikes the baffle plates (not shown) within the sump bowl to effect the separation of substantially all of the liquid particles from the air flow, just as before. The separated air, now flowing upwardly, passes up through the annular chamber defined between drum member 152 and body housing 140 and thence into the filter elements 90 disposed at the upper end of the housing. As before, the filter elements remove the few remaining particles in the air stream, the latter then passing upwardly through opening 146 into the discharge line from the apparatus.

It is well to note the flexibility which is achieved by the present invention. Since one feature of the invention resides in the provision of uniformly designed and constructed filter and condenser elements, respectively, great manufacturing economies can be achieved by standardizing tooling and designing the various embodiments for different capacities or liquids so that they utilize the standardized filter and condenser elements in various combinations and numbers, depending upon the aforementioned considerations. Since each of the filter and condenser elements is a self-contained unit, uniformity and constant performance characteristics can be assured. In addition, the elements are relatively small and compact, and are of very rugged construction, so that inventory problems and damage due to physical abuse are minimized. Also, because the elements are disposable, no messy cleaning job is required.

In FIGURE 14 there is illustrated a modified sump bowl construction applicable to both of the disclosed embodiments. In this construction both the baffle plates and the petcock previously associated with the sump bowl are eliminated, and into the threaded aperture adapted to receive the petcock there is threadably secured an automatic float operated drain trap 170. The drain trap 170 is a commercially available item and is provided at the upper end thereof with a perforated tubular member 172 extending upwardly into the sump bowl, and at the lower end thereof with a manually operable petcock 174. In operation, the interior bottom and side walls of the sump bowl act as a baffle means for reversing the direction of flow of the air flowing downwardly thereinto. The liquid which is separated, however, does not collect in the sump bowl, but passes through the perforations in the tubular member 172 and downwardly into the drain trap 170. Automatic float control means (not shown) are provided within the drain trap 170 to allow oil which has collected therein to discharge through petcock 174 when it has reached a certain level. Thus, when automatic operation is desired, the petcock 174 should be set in an open position and disposed above some suitable drain. The automatic drain traps does not form a part of the present invention, however it does illustrate another of the many possible embodiments of the present invention.

Considering applications where it is desired to remove entrained oil and water mist from an ordinary compressed air system, one of the more common applications of the present invention, it has been found that one specific condenser construction yields optimum results in this particular application. This extremely successful condenser is constructed exactly as shown in FIG. 8, the following specific materials being used. Reinforcing grids 46 are Ryerex expanded metal flattened carbon steel (style designation ¼" #20–22), having openings 3⁄32" x 11⁄16" constituting approximately 45% of the surface area thereof, and having a cadmium plate with dichromate-dip finish. The exact construction of the reinforcing grids, however, is not critical. Liners 48 are a plain weave fabric having warp and filling yarns each of 250 denier Dacron (bright), a count of approximately 66 x 48 finished, a weight of approximately 4.2 ounces per square yard, and a break strength (grab method) of approximately 300 x 210. These specifications are based on a scoured and heat-set sample and have been found to be important in yielding optimum results. Screens 44 are formed of No. 14 mesh aluminum wire cloth having a wire diameter of .020 inch and a width of mesh opening of .051 inch, although their exact construction is not particularly critical. The coalescing medium 42 used is a chemically inert diatomaceous earth having a particle size that will pass through a Tyler screen No. 10, National Bureau of Standards No. 12, and will not pass through a Tyler screen No. 20, National Bureau of Standards No. 20. The material is available under trade-mark Floor-Dry, No. 85, from the Eagle Picher Company, and has an oil absorption of roughly 96 to 125 pounds of SAE No. 10 oil per 100 pounds of material, and a water absorption of roughly 115 to 145 pounds of water per 100 pounds of material. Assembly is effected by bonding together with an adhesive the outer rims of a grid 46, a screen 44, a liner 48, and then another screen 44, in that order, to form a sandwich which is then placed in the upper portion of casing 30 and secured thereto in the manner illustrated by means of an adhesive. The condenser is then filled with an accurately predetermined volume of the diatomaceous earth, another similar sandwich of liner, screens and grid, and the upper and lower portions of the casing are pressed together. The final volume of the bed is less than the original volume so that it will be compacted to facilitate the formation channels therethrough for doing an optimum job of coalescing, in the present case of oil and water mist and particle sizes down to two microns. For best results it has been found that the condenser medium should be compressed 10 to 12% and preferably 11% from its original free volume to its final compacted volume. If desired, the filter may be constructed from exactly the same materials as the condenser.

Referring still to probably the most likely application of the present invention, it has been found that regardless of the exact embodiment of the invention, certain proportions and dimensions give particularly good results in an apparatus for removing oil and mist particles, as well as the solids normally found, in a compressed air system. Considering, for example, the unit illustrated in FIGURE 1, it has been found that when certain dimensions are followed unexpectedly good results are obtained. These dimensions include the diameter and area of the inlet passageway to the condenser, D*i* and A*i* respectively; the diameter and area of the coalescing medium in the condenser, D*c* and A*c*; the diameter and area of the nozzle at the outlet of the condenser, D*n* and A*n*; the depth of the coalescing medium within the condenser, L*c*; the diameter and area of the sump, D*s* and A*s*; the distance between the condenser nozzle and the first baffle in the sump, L*s*; the width and area of the annular space between the condenser casing and the housing, L*a* and A*a*; the distance between the inlet passageway through the housing and the inlet opening to the filter, L*h*; the diameter and area of the inlet to the filter, D*f* and A*f*; the depth of the filtering medium, L*f*; and the diameter and area of the filter medium, D*m* and A*m*. These dimensions are indicated in FIGURES 1, 8, and 10, and for a unit similar to that shown in FIGURE 1 having a rated flow capacity of 20 standard cubic feet per minute would be substantially as set forth in the following table:

*Dimensions for 20 s.c.f.m. unit*

| | Inches |
|---|---|
| D*i* | .4375 |
| D*c* | 2.203 |
| D*n* | 1.000 |
| L*c* | .705 |
| D*s* | 2.292 |
| L*s* | 2.188 |
| L*a* | .298 |
| L*h* | .254 |
| D*f* | 2.275 |
| L*f* | .953 |
| D*m* | 2.582 |

| | Sq. in. |
|---|---|
| A*i* | .1504 |
| A*c* | 3.812 |
| A*n* | .7854 |
| A*s* | 4.126 |
| A*a* | 2.39 |
| A*f* | 4.065 |
| A*m* | 5.236 |

A unit constructed using these more important dimensions in conjunction with the aforementioned exemplary condencer has been found to be capable of removing 98% of all oil and water particles entrained in the air down to a size of two microns and 100% of all particles down to a size of four microns. When a unit of larger flow capacity is desired it has been found that similarly optimum results may be obtained by maintaining certain of the dimensional ratios and adding an additional condenser element of identical construction for each additional 20 s.c.f.m. of flow desired, in a construction such as that illustrated in FIGURES 11 through 13. Thus, the particular unit illustrated in these figures would have a rated capacity of 80 s.c.f.m., since four condensers are utilized. Insofar as the filters are concerned, four of the 20 s.c.f.m. filters may be utilized, as illustrated, or in lieu thereof there may be utilized a single larger annular filter, the details of construction thereof not being particularly critical. In any case, however, the following dimensional ratios should preferably be maintained:

| RATIO | PREFERRED | RANGE |
|---|---|---|
| *An/Ai* | approx. 5.2 | 5.0–5.5 |
| *Aa/An* | approx. 3.0 min | 2.0 |
| *As/Aa* | approx. 1.7 min | 1.5 |

The *An/Ai* ratio is important to create a pressure drop across the condenser which is ideal for optimum coalescing, using the aforementioned exemplary grids, screens, liners and condensing medium. The *Aa/An* and *As/Aa* ratios are important to create a quiet zone before flow reversal to prevent the flow stream from carrying upwardly the droplets which should be separated. In multiple condenser units, A*n* will be understood to be the total area of all the discharge nozzles of all the condensers used, A*i* as the sum total of all the inlets to all the condensers, A*a* as the annular area between the exterior of drum member 152 and the housing and A*f* as the total inlet opening to the filter or filters, regardless of whether or not a single larger filter or a plurality of smaller filters are used. In any given unit, L*s* should be of sufficient magnitude to prevent the reversed flow of air from carrying upward the droplets which have been or should have been mechanically separated, and would depend upon the flow rates and velocities involved. In other words, the distance should be such that a quiet zone exists in the flow stream just prior to reversal. Also, there is preferably provided a relatively quiet zone at the entrance to the filter or filters, since the lower the velocity through each filter the more thorough the filtering action. Such a zone exists in the illustrated embodiment, since the portion of the chamber adjacent the filter is of greater volume than the annular portion thereof around the condenser. The filters, regardless of the type used, are peferably constructed such that the pressure drop thereacross when new is roughly one-half the pressure drop across the condensers at rated flow; i.e., maximum flow. This is achieved in the exemplary dimensioned 20 s.c.f.m. unit by constructing the filter of the exact same materials as the condenser, but compacting it 9+1% This will give sufficient pressure differential between the condensers and filters to minimize the chance of the entrained droplets being carried upwardly instead of being separated, and it is not so large that there will be insufficient velocity through the condenser for proper coalescing. As the unit is used the filters will, of course, eventually become clogged and therefore will have a slowly rising pressure drop thereacross throughout their useful life. It has been found that an easily determinable and good time to replace the filters is when the pressure drop thereacross becomes twice the pressure drop across the condensers, the latter remaining substantially constant throughout the life of the entire unit.

It is contemplated that probably the most common need for the present invention will be in applications where liquid removal is now being effected by conventional filtering apparatus. In this regard, the advantages of the present invention over conventional filtering systems are manifold. Not only does the present system have tremendous flexibility, but it has an overall operating life which is substantially greater than the total operating life of any equivalent filtering system. This is due to the provision of condensing and separating means which alone are capable of removing 96 to 97% of the liquid matter for an unlimited durtion, without being replaced or maintained in any way.

Thus, there is disclosed in the above description and in the drawings several exemplary embodiments of the present invention which fully and effectively accomplish the objects thereof. Insofar as the specific condenser construction and specific housing dimension ratios are concerned, it is to be understood that although they represent a particularly good way to remove oil and water mists from compressed air, they certainly do not represent the only way in which the apparatus will operate. Accordingly, it will be understood by those skilled in the art that the specific details of construction and arrangement of parts, as described, are by way of example only and are not to be construed as limiting the scope of the invention.

What is claimed is:

1. Apparatus for effecting the separation of a gas dispersoid from its gaseous suspension medium, comprising: housing means; first means defining an inlet passageway for communicating a gas dispersoid in a gaseous suspension medium into said housing; condenser means in said housing in communication with said inlet passageway for coalescing and agglomerating substantially all of the dispersoid particles passing therethrough into larger conglomerate particles, said condenser means including a bed of condensing medium adapted to function in a condition in which it is saturated with the dispersoid material; nozzle means in said housing downstream of and below said condenser means for accelerating the larger conglomerate particle and gaseous medium flow in a downward direction from said condenser means; deflecting means in said housing for substantially reversing the flow of gaseous medium from said nozzle means to an upward direction to cause at least a portion of the larger conglomerate particles therein to be carried out of the flow stream by the influence of inertia aided by gravity; filter means in said housing downstream of said deflecting means for sorbing dispersoid particles remaining in the gaseous medium, said filter means including a bed of sorbent filtering medium adapted to function in a condition in which it is unsaturated with the dispersoid material; second means defining a passageway in said housing for communicating the flow of gaseous medium from said deflecting means to said filter means; and third means defining a passageway for communicating said separated gaseous medium from said filter means out of said housing.

2. Apparatus as claimed in claim 1, wherein said bed of condensing medium consists essentially of the same material as said bed of filtering medium.

3. Apparatus as claimed in claim 1, wherein said bed of condensing medium and said bed of filtering medium each consist essentially of diatomaceous earth.

4. Apparatus as claimed in claim 1, wherein said second means communicates the flow of gaseous medium upwardly around the outside of said condenser means to said filter means.

5. Apparatus as claimed in claim 1, wherein asid condenser means comprises a casing having an inlet opening at one end in communication with said inlet passageway, and an outlet opening defining said nozzle means at the opposite end thereof, said inlet opening being smaller in area than said nozzle means, and the cross-sectional area of said casing between said openings being larger than the area of said nozzle means, said bed of condensing medium being disposed within said casing between said openings.

6. Apparatus as claimed in claim 4, wherein the cross-sectional area of the passageway defined by said second means around the outside of said condensing means is greater than the cross-sectional area of said nozzle means.

7. Apparatus as claimed in claim 6, wherein the ratio of said cross-sectional areas is at least 2.

8. Apparatus as claimed in claim 4, wherein said deflecting means includes means defining a chamber below said nozzle means, the cross-sectional area of said chamber being greater than the cross-sectional area of the passageway defined by said second means around the outside of said condensing means.

9. Apparatus as claimed in claim 8, wherein the ratio of said cross-sectional areas is at least 1.5.

10. Apparatus as claimed in claim 4, wherein the cross-sectional area of said bed of filtering medium is greater than the cross-sectional area of the passageway defined by said second means around the outside of said condensing means.

References Cited by the Examiner

UNITED STATES PATENTS

| | | | |
|---|---|---|---|
| 1,368,540 | 2/1921 | Bovard | 55—522 |
| 1,379,056 | 5/1921 | Smith. | |
| 1,416,266 | 5/1922 | Clapp | 55—524 |
| 1,751,915 | 3/1930 | Hall et al. | 55—322 |
| 1,860,778 | 5/1932 | Howard | 55—324 |
| 2,087,688 | 7/1937 | Johnson | 55—516 X |
| 2,096,851 | 10/1937 | Fricke | 55—319 |
| 2,459,398 | 1/1949 | Walters | 55—378 X |
| 2,467,408 | 4/1949 | Semon | 55—325 |
| 2,470,202 | 5/1949 | Wickenden | 210—75 |
| 2,521,785 | 9/1950 | Goodloe | 55—482 |
| 2,523,793 | 9/1950 | Vance. | |
| 2,556,295 | 6/1951 | Pace | 55—528 X |
| 2,652,152 | 9/1953 | Frankenhoff | 210—75 |
| 2,692,655 | 10/1954 | Peeps | 55—457 |
| 2,737,261 | 3/1956 | Duncan et al. | 55—333 |
| 2,827,267 | 3/1958 | Ris | 55—208 |
| 2,835,340 | 8/1958 | McGuff et al. | |
| 2,848,060 | 8/1958 | McBride et al. | |
| 2,890,763 | 6/1959 | Kraissel | 55—324 |
| 2,894,600 | 7/1959 | Veres | 55—426 X |
| 2,929,503 | 3/1960 | Ambruster et al. | |
| 2,989,443 | 6/1961 | Martin | 55—494 X |
| 3,056,247 | 10/1962 | Pindzula et al. | 55—97 |
| 3,066,462 | 12/1962 | Yap et al. | 55—97 |
| 3,080,971 | 3/1963 | Hutto | 210—75 |

FOREIGN PATENTS

| | | |
|---|---|---|
| 625,394 | 8/1961 | Canada. |
| 1,049,527 | 1/1959 | Germany. |
| 1,064,434 | 8/1959 | Germany. |
| 813,348 | 5/1959 | Great Britain. |

HARRY B. THORNTON, *Primary Examiner.*

REUBEN FRIEDMAN, *Examiner.*

B. NOZICK, *Assistant Examiner.*